J. MACGREGOR.
COFFEE POT.
No. 10,752.
Patented Apr. 11, 1854.
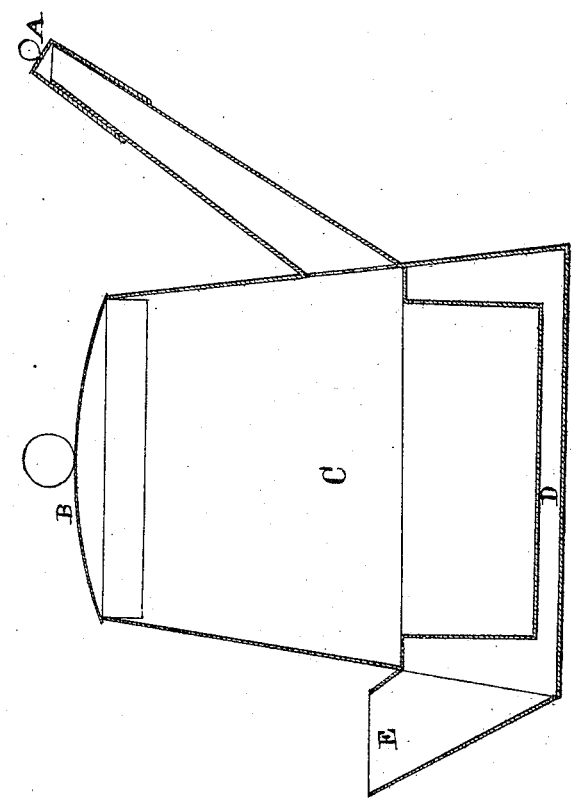

UNITED STATES PATENT OFFICE.

JAMES MacGREGOR, JR., OF TROY, NEW YORK.

COFFEE-POT.

Specification forming part of Letters Patent No. 10,752, dated April 11, 1854; Reissued October 27, 1868, No. 3,176.

*To all whom it may concern:*

Be it known that I, JAMES MACGREGOR, Jr., of Troy city and county of Rensselaer, State of New York, have invented new and useful Improvements in the Construction of Tea and Coffee Pots, whereby the tea and coffee is prepared in air-tight pots, at or near boiling heat, and by pressure prevented from boiling, thereby preventing all loss heretofore sustained by evaporation, and I do declare that the following is a full, clear, and exact description thereof, reference being had to the accompanying drawing and the letters of reference marked thereon.

The nature of my improvements consists:

1st. In surrounding the bottom (or bottom and sides as far as may be desired) of tea or coffee pots with an outer case, which may, or may not be, attached to the tea or coffee pot, leaving a space, for water, between the inner and outer case, of sufficient capacity to prevent evaporation, from reducing the water between the two cases, below the bottom of the tea or coffee pot, while the tea or coffee is being prepared, &c. There is no loss from evaporation (none being allowed.) The coffee or tea may be steeped some longer to advantage than in the former mode.

2d. In having a mouth piece to the outer case, for the purpose of pouring water (or other fluid) between the two cases and for the escape of steam made between the two cases, while the pot is on the heating apparatus. This mouth piece is always to be kept open. When it is removed from the heating apparatus, this mouth piece may be covered to retain heat. The space between the cases should not be filled more than three-fourths full, thereby allowing free escape, to the steam made between the two cases, and by that means preventing the water in the tea and coffee pot from becoming much above boiling heat. The inner case or pot where the tea or coffee is put, is generally made as much smaller below where the outer case is to join, as is desired for water space, thus leaving the outside of a uniform appearance. The handle is put on the side, half way between the spout and mouth piece, they being exactly opposite to each other.

3rd. In having an airtight cover, to the spout and top of the pot, of sufficient weight and adhesion, to cause pressure sufficient to prevent the tea or coffee from boiling, while being drawn or prepared. The pot and all parts are generally made of tin.

Figure 1 represents a vertical section.

(A) is the cover of the spout, (B) is the cover to the pot, (C) is the space for tea or coffee, (D) is the space for water between the two cases, (E) is the mouth piece attached to the outer case, for the admission of water and the exit of steam. When this pot is to be used the space between the two cases, is to be about three fourths filled, with water, and the mouth piece left open. The tea or coffee should then be put into the pot, and then the desired quantity of water put on. Then the covers should be carefully put on to the spout and top of the pot. The pot is then put on to a heating apparatus, and some more time allowed for drawing or preparing the tea or coffee, than is advantageous by the present mode. The water between the two cases should boil while the tea or coffee is being prepared.

Having thus fully described the nature of my improvements, and the mode of using the same, what I claim as my improvements and desire to secure by Letters Patent is—

Having the pot where the tea or coffee is prepared air tight, and so regulating the heat, that is applied, to the heating of the same, that a small pressure, by the covers, prevents it from boiling, and consequently from evaporation, while the tea or coffee is being prepared, in the manner and for the purpose substantially as above set forth.

JAMES MacGREGOR, JR.

Witnesses:
   I. L. BARNEY,
   E. SNOW.

[FIRST PRINTED 1913.]